Aug. 20, 1929.					M. F. STEIN					1,724,977
APPARATUS FOR CONTROLLING THE FLOW OF FLUIDS
Filed Feb. 19, 1925					2 Sheets-Sheet 1
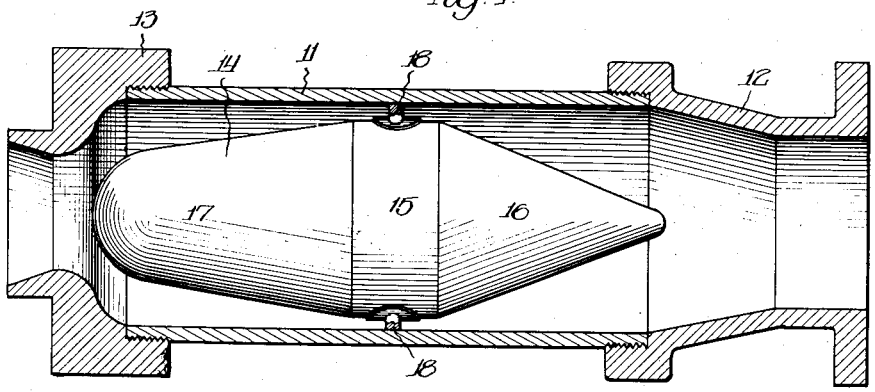
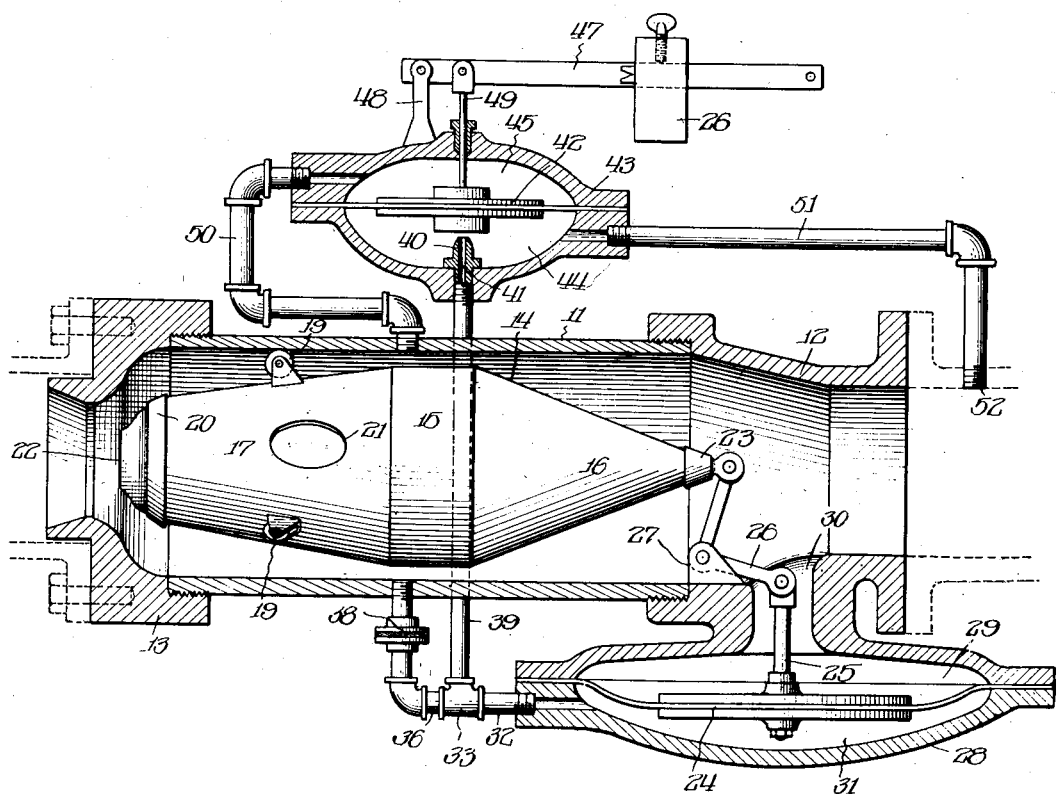
Inventor:
Milton F. Stein,

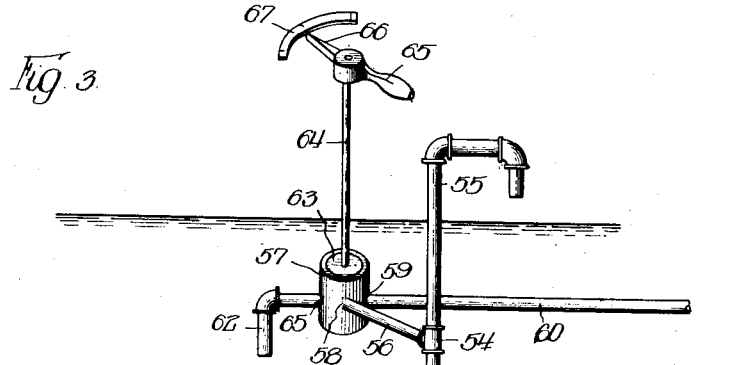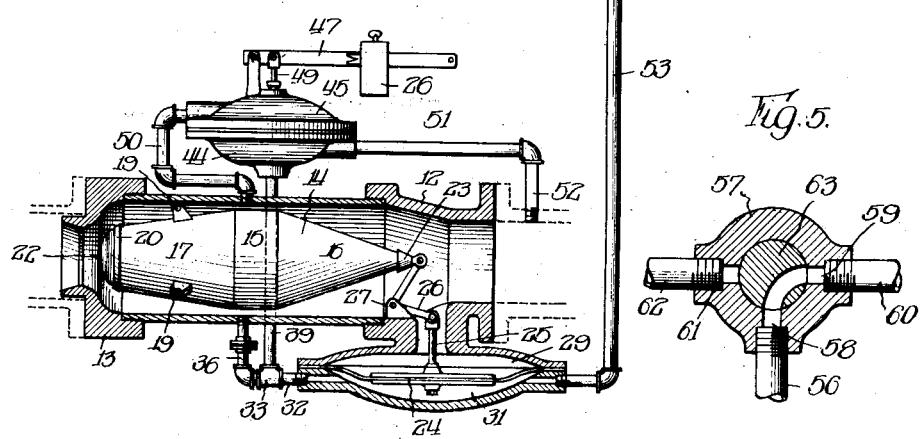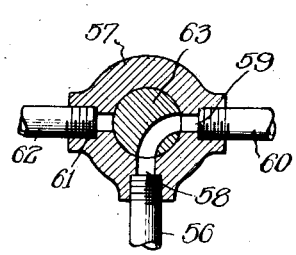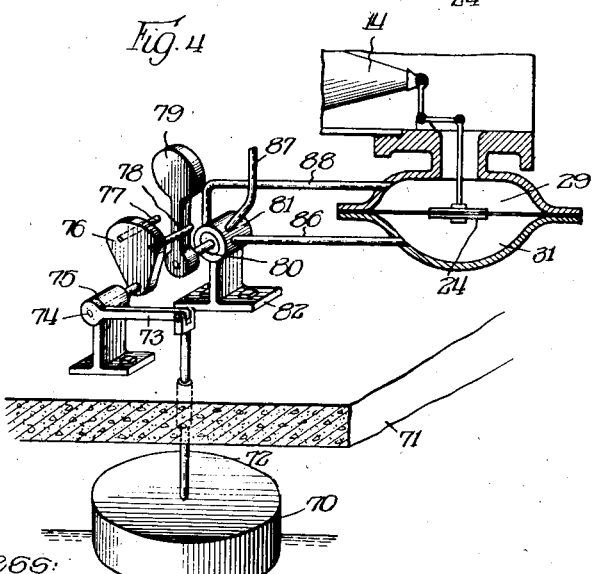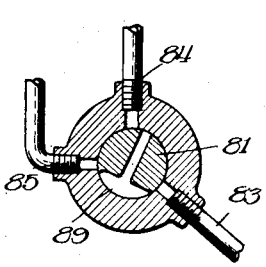

Patented Aug. 20, 1929.

1,724,977

UNITED STATES PATENT OFFICE.

MILTON F. STEIN, OF CHICAGO, ILLINOIS, ASSIGNOR, BY MESNE ASSIGNMENTS, TO GENERAL ZEALITE COMPANY, OF CHICAGO, ILLINOIS, A CORPORATION OF ILLINOIS.

APPARATUS FOR CONTROLLING THE FLOW OF FLUIDS.

Application filed February 19, 1925. Serial No. 10,439.

My invention relates generally to apparatus for creating differential pressure and mechanism for controlling the flow of fluids, which are particularly useful to regulate the flow in water purification systems.

An object of the invention is to provide a meter tube of improved design and constructional features.

Another object of the invention is the provision of a rate controller wherein hunting and surging of the flow is eliminated.

A further object of the invention is to provide apparatus which in addition to its primary function as a rate of flow controller, will act as a shut-off valve.

A further object of the invention is to provide, with apparatus of the class described, related mechanism which will cut off the flow of liquid into a storage tank upon the capacity thereof being reached.

A still further object of the invention is to provide apparatus which may be mounted either horizontally or vertically.

That the invention may be better understood, reference is had to the accompanying drawings, wherein;

Fig. 1 is a longitudinal sectional view of a meter showing the constricting member fixedly mounted therein;

Fig. 2 is a longitudinal view of the meter in conjunction with rate controlling mechanisms.

Fig. 3 is a longitudinal sectional view of the device showing in association therewith a manually operated shut-off controller;

Fig. 4 is a longitudinal sectional view showing an automatic control which is adapted to be used in connection with a storage tank for regulating the amount of liquid therein;

Fig. 5 is a detailed sectional view of a two-way plug valve which may be used in connection with the manually operated shut-off shown in Fig. 3 and Fig. 6 is a detailed sectional view of a two-way plug valve which may be used in connection with the automatic control shown in Fig. 4.

Referring to Fig. 1, the body of the apparatus comprises a tube 11 having in association therewith an inlet end member 12 and an outlet end member 13, which are conveniently attached to the tube 11 through the medium of complementary screw threaded portions. The interior of inlet end 12 is preferably frusto-conical in shape and the outlet end 13 has a substantially bell-shaped interior. A stationary constricting member 14, having a cylindrical medial portion 15 and two oppositely tapering end portions 16 and 17, is coaxially mounted in the tube by suitable fastenings to the supporting members 18.

The portion of the apparatus thus far described is useful as a meter, or as mechanism for creating differential pressures, as it presents within the tube areas equivalent to and relatively associated as those found in a Venturi tube.

In Fig. 2 the meter is shown connected with apparatus suitable for adapting the same for use as a rate of flow controller. The constricting member 14 in this embodiment of the invention is mounted on castors 19 and is adapted to move longitudinally. The end 17 of the constricting member 14 is provided with a nose 20 which is adapted to interfit with the bell-shaped interior of the outlet end 13 and shut off the flow through the tube when the constrictor is moved toward the same. The end 16 of the constrictor is equipped with a cap 23 which is operably associated with a primary diaphragm 24 through means of a rod 25, and an intermediate bell crank lever 26, which is fulcrumed in the block 27. The side wall of the constricting member 14 is provided with a plurality of ports 21 and the nose piece 20 with an orifice 22 through which a minimum flow is permitted at all times.

A primary diaphragm 24 is mounted in the housing 28 and divides the same into chambers 29 and 31. The inner chamber 29 is in direct communication with the tube 11 through the channel 30. The outer chamber 31 is provided with an inlet which may be in the form of a stub pipe 32 connected to a T 33. A conduit 39 extends upwardly from the said T to the inner chamber 44 of a secondary diaphragm, and has connected to its end, within the diaphragm chamber, a plug 40, which is centrally bored to provide an orifice 41. The orifice 41 is of greater diameter than the restricting orifice 38 which is positioned in the pipe 36, the said pipe 36 connects the other end of the T 33 with tube 11.

A secondary diaphragm 42 is mounted in the housing 43 and divides the same into an inner chamber 44 and an outer chamber 45. The inner chamber 44 is in communication with the intake 52 through the pipe 51 and as has been above mentioned, the plug 40 containing the orifice 41 is mounted therein. The outer chamber 45 is in communication with a restricted area of the tube by the pipe 50.

The secondary diaphragm 42 is controlled by means of the counterweight 26 which is slidably mounted on the graduated beam 47. The said beam is fulcrumed on the arm 48 and connected to the diaphragm by means of the rod 49.

In operation, an increase in the rate of flow reduces the pressure in the constricted area of the tube relative to that in the approach 52. The pressure at the throat of the tube is transmitted through pipe 50 to the outer diaphragm chamber 45 and that at the intake through pipe 51 to inner diaphragm chamber 44. The resulting increase in the differential pressure on the secondary diaphragm causes the diaphragm to lift counter weight 26 thereby increasing the effective opening of the orifice 41. The increase in the opening of the orifice permits a flow from the intake 52 through pipe 51 into the inner diaphragm chamber 44 through the orifice 40, pipe 39, T 33, stub 32 and thence into the outer chamber 31 of the primary diaphragm. This flow into chamber 31 tends to equalize the pressure above the primary diaphragm 24, thereby permitting the unbalanced pressure exerted on the constricting member 14, by the flow through the tube, to pull the same forward. The forward movement of the constricting member brings the nose 20 into closer relationship with the outlet end 13, thereby decreasing the area of flow, and consequently causing an increase in pressure in the constricted areas of the tube relative to that at the intake.

This change in pressure is transmitted to the secondary diaphragm and causes the same to move downward, decreasing the effective opening of the orifice 41. This downward movement and the consequent decrease in the opening of the orifice 41 continue until the apparatus adjusts itself to the point where the flow through the orifice 41 equals that through the orifice 38, whereupon the movement of the diaphragm ceases and the apparatus assumes a state of equilibrium.

Should there be a decrease in the rate of flow through the tube, it is apparent that the reverse of the above described action would occur.

It is obvious, from the foregoing description, that the controller may be set to any desired rate by adjustment of the weight 26 on the graduated beam 47.

The ports 21 in the constricting member 14 and the orifice 22 in the nose 20 are provided to insure some flow through the apparatus thus avoiding the possibility of closing the tube and destroying the variations in pressure within the tube upon which the operation of the device depends.

The apparatus of Fig. 2 may be associated with the manually operated controlling mechanism shown in Fig. 3 to act as a shut-off valve. In this adaptation the ports 21 and the orifice 22 are omitted from the constricting member 14 and the nose 20, respectively, to permit complete closing of the tube. The additional control mechanism comprises a pipe 53 connected to the outer chamber 31 of the primary diaphragm, a T 54 in said pipe, an overflow or exhaust pipe 55, extending vertically from the said T, and a conduit 56 extending horizontally from the T. The conduit 56 leads to a plug valve 57 and is connected at port 58 thereof. Connected in two other ports of the plug valve 57 are a pressure pipe 60 connected at port 59 and having liquid under pressure supplied thereto from any convenient source, and a pressure releasing pipe 62 connected at port 61. The plug 63 of the valve is of the two-way type and so constructed that it can be positioned to connect the ports 58 and 59 or the ports 58 and 61 and when in the intermediate position completely closes all of the ports. It is to be noted that the valve is positioned at a point below the surface of the water acting upon the controller, in order that the overflow pipe may afford a reduction of pressure in the primary diaphragm chamber 31 when the same is connected thereto.

A convenient operating means is associated with the plug 63 which comprises a rod 64 attached thereto and a handle member 65 equipped with an indicating point 66 and a scale 67.

When it is desired to shut off the flow, the plug 63 of the plug valve 57 is positioned with the channel therein connecting the pressure pipe 60 with the pipe 56 which permits the pressure in pipe 60 to be transmitted through pipe 56 and pipe 53 to the outer chamber 31 of the primary diaphragm. This pressure lifts the primary diaphragm, forcing the constricting member forward and causes the nose piece to engage with the end member and shut off the flow.

To re-establish the flow the plug 63 is rotated to connect the pressure release conduit 62 with the pipe 56, thereby reducing the pressure in the diaphragm chamber 31 and causing the primary diaphragm to be forced down by the pressure in the tube 11 and draw back the constricting member from the end of the tube, thereby reopening the exhaust portion of the apparatus. The plug is then positioned to shut all the ports and the apparatus resumes its function as a rate controller.

When it is desirable to have the apparatus automatically controlled, the controlling device shown in Fig. 4 may be utilized. The controller comprises a float 70 located in a storage tank, the top 71 of which is partially shown in the drawings. The said float is connected to a tripping mechanism by means of the rod 72, which passes through the top of the storage tank and is pivotally connected to the lever 73. The lever 73 is in turn fixedly secured to the shaft 74 of the tripping mechanism. The said tripping mechanism comprises a standard 75 in which the shaft 74 is rotatably mounted. Fixedly secured to the shaft 74 is a tripping quadrant 76, which is provided with two pins 77 and 78 that engage the weight 79. The said weight is fixedly secured on a shaft 80 and controls a plug valve 81 which is also secured to the shaft and which is mounted on the standard 82. The said plug valve 81 is provided with three ports 83, 84 and 85 respectively. Leading from port 83 is a conduit 86 which is in communication with the inner diaphragm chamber 31 of the primary diaphragm; from port 84 is a release or overflow pipe 87 and from port 85 is a conduit 88 which is in communication with the outer diaphragm chamber 29 of the primary diaphragm. The channel 89 in the plug valve 81 is so constructed that the valve may be positioned to connect any two of the ports or close all of them.

In operation when the float 70 rises in the storage tank the tripping quadrant 76 is actuated thereby and causes the pin 78 to raise the weight 79, thereby carrying the latter to an upright position and letting it drop to strike pin 77, in which position the ports 83 and 85 of the plug valve are connected and a flow is permitted through conduits 88 and 86 which results in the equalization of the pressures on the faces on the primary diaphragm 24. The pressure on the constricting member 14, resulting from the flow through the tube, will push the same forward to close the tube.

As the liquid in the storage tank is consumed and the float 70 drops the tripping quadrant 76 will be moved back, during which movement the weight 79 will be moved back closing the ports 83 and 85 and making connection between the ports 83 and 84 when it assumes a perpendicular position relative to the top 71. When the plug valve is in this position the pressure in the outer diaphragm chamber 31 is permitted to escape through conduit 86 and the overflow pipe 87 with the result that sufficient differential pressure is created on the diaphragm 24 to push the latter down and draw the constricting member 14 back to re-establish the flow through the tube. As the weight 79 drops back on the finger 78, all of the ports of the plug valve 81 are closed, until a subsequent change in the level of the liquid in the storage tank.

During the closing operation as the weight 79 is lifted to an upright position ports 83 and 84 will be connected for a brief period thus causing a slight overflowing until the weight 79 drops on the finger 77. However, this is of no consequence as the overflow pipe may be bent to pass the overflow into the storage tank or it may be disposed of otherwise.

I claim:

1. A rate of flow controller comprising a cylindrical tube, a constricting member slidably mounted therein, said constricting member having an enlarged medial portion forming a constant restriction and oppositely tapering end portions, one of which is adapted to interfit with an end of the tube and to restrict the flow therethrough upon movement toward the same, and means associated with said tube and actuated by the differential pressure resulting from said constricting member for controlling the movement of said constricting member incident to change in the rate of flow.

2. A rate of flow controller comprising a cylindrical tube, a constricting member slidably mounted in said tube adapted to set up a constant restriction and also adapted upon movement therein to change the flow therethrough, means associated with said constricting member for operating the same, and means associated with said tube and actuated by the difference in pressure within said tube resulting from the presence of said constricting member for controlling said operating means.

3. A rate of flow controller comprising a tube having a constricting member slidably mounted therein, said constricting member having an enlarged medial portion and oppositely tapering end portions one of which is adapted to interfit with an end of the tube and to restrict the flow therethrough upon movement toward the same, a diaphragm, means for connecting the constricting member to the diaphragm, means operable incident to change in the rate of flow for controlling the said diaphragm and means manually operated for controlling the pressure on the said diaphragm.

4. A rate of flow controller comprising a tube, a constricting member slidably mounted therein, a diaphragm, means for operatively associating the diaphragm and the constricting member, means operable incident to change in the rate of flow for controlling the said diaphragm, and manually operated means for controlling the pressure on the said diaphragm, said manually operated means comprising a pipe connected in one chamber of the said diaphragm, a valve associated with said pipe and adapted to connect said pipe to a source of liquid under pressure and also to connect said pipe to a second pipe for releasing the pressure in the diaphragm chamber.

5. A rate of flow controller comprising a tube, a constricting member having an enlarged medial portion slidably mounted therein, a diaphragm having one chamber in communication with said tube, means for connecting said diaphragm to said constricting member, a second diaphragm having one chamber thereof in communication with said tube in the region of the enlarged portion of said constricting member and means associated with the second diaphragm for applying pressure in the second chamber of the first-mentioned diaphragm incident to the change in the rate of flow.

6. A rate of flow controller comprising a cylindrical tube, a constricting member having an enlarged medial portion slidably mounted in said tube, a primary diaphragm having one chamber in communication with said tube and operatively connected with said constricting member, a secondary diaphragm having one chamber in communication with said tube in the region of the enlarged portion of said constricting member, means connecting the other chamber of said secondary diaphragm to a source of fluid under pressure, means associated with said diaphragm for directing said fluid incident to the change in the rate of flow into the second chamber of said primary diaphragm and an escape for gradually releasing the pressure in the second chamber of said primary diaphragm.

7. A rate of flow controller comprising a tube, a constricting member having an enlarged medial portion in said tube, a diaphragm operatively connected to said constricting member, means for deriving pressure from said tube in the region of the enlarged medial portion of said constricting member and means for utilizing said pressure to regulate the differential pressure on said diaphragm incident to change in the rate of flow.

8. A rate of flow controller comprising a tube having a constricting member slidably mounted therein, said constricting member having an enlarged medial portion and oppositely tapering end portions, one of which is adapted to interfit with the end of the tube and restrict the flow therethrough, a diaphragm, means for connecting the constricting member to the diaphragm, means operable incident to change in the rate of flow for controlling the said diaphragm, a storage tank and means operable incident to change in the level of the liquid in said storage tank for controlling the pressure on said diaphragm.

9. A rate of flow controller comprising a tube having a constricting member mounted therein, a diaphragm, means for connecting the constricting member to the diaphragm, means operable incident to the change in the rate of flow for controlling the pressure on said diaphragm, manually operable means for controlling pressure on said diaphragm, a storage tank and means operable incident to change in the level of the liquid in said storage tank for controlling the pressure on said diaphragm.

10. A rate of flow controller comprising a tube, a constricting member slidably mounted in said tube, a diaphragm having one chamber connected to said tube, means for conecting said constricting member to said diaphragm, a second diaphragm operatively connected with said tube and the first-mentioned diaphragm for controlling the action of the same incident to change in the rate of flow, a storage tank, a float positioned in said storage tank, a valve, means operatively connecting said flow with said valve, an overflow pipe connected with said valve and pipes connecting said valve to both chambers of the first mentioned diaphragm, said valve being so constructed that upon actuation by said float, it will control the differential pressure on said diaphragm.

11. In a fluid flow controller, a conducting means for the fluid, an elongated restricting device enclosed by said conducting means, means rigidly associated with the device for setting up a constant restriction in said conducting means, additional means rigidly associated with a different part of said device for setting up a variable restriction in said conducting means, and means for controlling said variable restricting means actuated through the decrease in pressure caused by the constant restricting means.

12. In a fluid flow controller, a circular conducting means for the fluid, a circular elongated device enclosed by said conducting means, means rigidly associated with the medial portion of said restricting device for setting up a constant restriction in said conducting means, and additional means rigidly associated with the end portion of said device for setting up a variable restriction in said conducting means, and means for controlling said variable restricting means actuated through the decrease in pressure caused by the constant restricting means.

13. In the fluid flow controller as set out in claim 11 means for neutralizing said controlling means and means for closing said conducting means when said controlling means is neutralized.

14. The fluid flow controller as set out in claim 12 in which the variable restricting means is positioned at the end of the slidable device in the direction of the flow and in which are included means for neutralizing the controlling means and permitting the variable restricting means to stop the conducting means.

15. A rate of flow controller comprising a conducting means, an elongated member movably mounted within said conducting means, said elongated member being adapted to set up a constant restriction in said conducting means and also being adapted to set up a variable restriction by its movement in said conducting means, and means for moving the elongated member in said conducting means actuated by the pressure set up in the constant restriction.

16. A rate of flow controller comprising a tube having a constricting member slidably mounted therein and adapted upon movement toward an end of the tube to restrict the flow therethrough, a pressure responsive device, means for connecting the constricting member to the pressure responsive device, means actuated by the difference in pressure within said tube and operable incident to change in the rate of flow for controlling the pressure on the said pressure responsive device, and means for equalizing the pressure upon said pressure responsive device so as to permit the constricting member to be moved by the liquid flowing through the tube.

17. A rate of flow controller comprising a tube, a constricting member slidably mounted in said tube and adapted upon movement toward an end of the tube to restrict the flow therethrough, a primary pressure responsive device, means for connecting said primary pressure responsive device to said constricting member, a secondary pressure responsive device, both devices being operated by the differential pressure in the tube, resulting from the presence of said constricting member, and means associated with the secondary device for controlling the pressure on the primary device.

18. In combination with a flow control apparatus, a fluid conducting means, a constant restriction in said conducting means, a variable restriction in said conducting means, and two pressure responsive devices actuated by the differential pressures set up by said constant restriction, one of said pressure responsive devices being also actuated by the other and being adapted to actuate the variable restriction and each of said pressure responsive devices being directly connected to the open and restricted portions of the conducting means.

19. In combination with a flow control apparatus, a liquid conduit, a constant and a variable restriction in said conduit, a pressure responsive device actuated by the differential pressure set up by said constant restriction and adapted to actuate said variable restriction, means adapted to neutralize the effect of said differential pressure upon said pressure responsive device, and means adapted to actuate the variable restriction when the pressure is neutralized.

20. In combination with a flow control apparatus, a liquid conduit, a constant and a variable restriction in said conduit, a pressure responsive device with its chambers in fluid communication with the open and constantly restricted portions of the conduit adapted to actuate the variable restriction, a second pressure responsive device with its chambers also in fluid communication with the open and constantly restricted portions of the conduit, and a fluid connection between the chamber of the first mentioned pressure responsive device in fluid communication with the constantly restricted portion of conduit and the chamber of the second mentioned pressure responsive device in fluid communication with the open portion of the conduit.

21. In combination with a flow control apparatus, a liquid, a constant and a variable restriction in said conducting means, a pressure responsive device actuated by the differential pressure set up by said constant restriction and adapted to actuate the variable restriction, means for descreasing the differential pressure acting upon said device when the flow in the line increases and means for increasing it when the flow in the line decreases.

22. In combination with a flow control apparatus, liquid conducting means, constant and variable restrictions in said conducting means, a pressure responsive device actuated by the differential pressure set up by said constant restriction and adapted to actuate the variable restriction, and means for admitting full line pressure to the low pressure side of the pressure responsive device.

23. In combination with a flow control apparatus, liquid conducting means, a valve in said conducting means, constant restriction in said conducting means adapted to set up a differential pressure, a diaphragm operatively connected to said valve, fluid connections from the conducting means at the place of constant restriction and at a place of no restriction to the opposite sides of the diaphragm, a fluid connection from a place of no restriction to the side of the diaphragm communicating with restricted portion of the conducting means, and means adapted to restrict the flow of fluids through said last mentioned fluid connection.

In testimony whereof I have hereunto subscribed my name.

MILTON F. STEIN.

CERTIFICATE OF CORRECTION.

Patent No. 1,724,977.  Granted August 20, 1929, to

MILTON F. STEIN.

It is hereby certified that error appears in the above numbered patent requiring correction as follows: In the assignment the name of the assignee was erroneously written and printed as "General Zealite Company", whereas said name should have been written and printed as "General Zeolite Company".

Page 1, line 30, after "longitudinal" insert "sectional", and line 55, after "of" insert "the"; page 5, lines 51 and 52, claim 19, lines 62, 63, 66, 70, 74, and 77, claim 20, for "conduit" read "Conducting means"; same page, line 79, claim 21, after "liquid" insert "conducting means"; and that the said Letters Patent should be read with these corrections therein that the same may conform to the record of the case in the Patent Office.

Signed and sealed this 15th day of October, A. D. 1929.

(Seal)

M. J. Moore,
Acting Commissioner of Patents.